United States Patent
Schoeneboom et al.

(10) Patent No.: US 12,229,785 B2
(45) Date of Patent: Feb. 18, 2025

(54) METHOD FOR DETERMINING THE CARBON FOOTPRINT OF A PRODUCT IN PRODUCTION PROCESSES OF A PRODUCTION PLANT

(71) Applicant: BASF SE, Ludwigshafen (DE)

(72) Inventors: Jan Schoeneboom, Ludwigshafen (DE); Olaf Huber, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 17/493,706

(22) Filed: Oct. 4, 2021

(65) Prior Publication Data

US 2022/0108327 A1 Apr. 7, 2022

(30) Foreign Application Priority Data

Oct. 5, 2020 (EP) .................................... 20200091

(51) Int. Cl.
| | | |
|---|---|---|
| *G06Q 30/018* | (2023.01) | |
| *G05B 19/406* | (2006.01) | |
| *G05B 19/418* | (2006.01) | |
| *G05B 23/02* | (2006.01) | |
| *G06Q 10/0639* | (2023.01) | |

(52) U.S. Cl.
CPC ......... *G06Q 30/018* (2013.01); *G05B 19/406* (2013.01); *G05B 19/4183* (2013.01); *G05B 19/41865* (2013.01); *G05B 19/4188* (2013.01); *G05B 23/0294* (2013.01); *G06Q 10/06393* (2013.01); *G05B 2219/32351* (2013.01);
(Continued)

(58) Field of Classification Search
CPC ................ G06Q 30/018; G05B 19/406; G05B 19/4183; G05B 19/41865; G05B 19/4188; G05B 2219/32351; G05B 2219/32354; G05B 2219/34351
See application file for complete search history.

(56) References Cited

U.S. PATENT DOCUMENTS

2010/0042453 A1 2/2010 Scaramellino et al.
2010/0274612 A1* 10/2010 Walker ............. G05B 19/41865
700/297

(Continued)

FOREIGN PATENT DOCUMENTS

| CA | 2725174 A1 * | 6/2011 | ............. G06Q 10/06 |
|---|---|---|---|
| CN | 108537434 A | 9/2018 | |

(Continued)

OTHER PUBLICATIONS

ISO 14067-2018(E), "Greenhouse gases—Carbon footprint of products—Requirements and guidelines for quantification" (Year: 2018).*

(Continued)

*Primary Examiner* — Dennis W Ruhl
(74) *Attorney, Agent, or Firm* — LOWENSTEIN SANDLER LLP

(57) ABSTRACT

The present invention is in the field of computer-implemented methods for determining the carbon footprint of a product in a production process in a production plant, in particular of a product in interconnected production processes. Certain embodiments of the present invention relate to a computer-implemented method for determining the carbon footprint of a product produced in production process of a production plant.

15 Claims, 4 Drawing Sheets

(52) U.S. Cl.
CPC ............ *G05B 2219/32354* (2013.01); *G05B 2219/34351* (2013.01)

(56) References Cited

U.S. PATENT DOCUMENTS

| | | | | |
|---|---|---|---|---|
| 2012/0021096 A1* | 1/2012 | Alho-Lehto | ........... | G06Q 10/06 283/67 |
| 2012/0150733 A1* | 6/2012 | Belady | ................... | G06Q 20/10 705/317 |
| 2013/0018809 A1* | 1/2013 | Li | ........................ | G06Q 30/018 705/317 |
| 2014/0012552 A1 | 1/2014 | Zik | | |
| 2018/0276679 A1* | 9/2018 | Fang | ....................... | G06Q 10/08 |
| 2022/0101212 A1* | 3/2022 | Graeber | ................. | G06Q 10/04 |
| 2023/0061787 A1* | 3/2023 | Feickert | ................ | G06F 16/283 |

FOREIGN PATENT DOCUMENTS

| | | | | |
|---|---|---|---|---|
| EP | 2244216 A1 | * | 10/2010 | ............. G06Q 10/04 |
| EP | 3637347 A1 | * | 4/2020 | ......... G06F 16/2379 |
| WO | WO-2018049796 A1 | * | 3/2018 | ............. G06Q 10/00 |
| WO | WO-2020074904 A1 | * | 4/2020 | ......... G06F 16/2379 |

OTHER PUBLICATIONS

European Search Report for EP Patent Application No. 20200091.5, Issued on Feb. 16, 2021, 4 pages.

He, et al., "Low-carbon conceptual design based on product life cycle assessment", The International Journal of Advanced Manufacturing Technology, vol. 81, Issue 5, May 14, 2015, pp. 863-874.

Song, et al., Development of a low-carbon product design system based on embedded GHG emissions, Resources, Conservation and Recycling, vol. 54, Issue 9, Jul. 2010, pp. 547-556.

* cited by examiner

METHOD FOR DETERMINING THE CARBON FOOTPRINT OF A PRODUCT IN PRODUCTION PROCESSES OF A PRODUCTION PLANT

CROSS-REFERENCE TO RELATED APPLICATION(S)

This application claims the benefit of priority of European Patent Application No. 20200091.5, filed on Oct. 5, 2020, the disclosure of which is hereby incorporated by reference herein in its entirety.

TECHNICAL FIELD

The present invention is in the field of computer-implemented methods for determining the carbon footprint of a product in production processes in a production plant, in particular of a product in interconnected production processes.

BACKGROUND

The significance of climate protection measures is growing rapidly in the perception of the public, regulators and financial investors. Major companies have announced ambitious short-term $CO_2$ reduction targets, including emissions related to purchased raw materials as, for example, required by the Science-Based Targets Initiative (SBTI). Therefore, transparency on Product Carbon Footprints (PCF) and options to reduce the PCF are increasingly demanded by customers.

According to the Greenhouse Gas Protocol (WBCSD, WRI, 2011) greenhouse gas emissions are categorized into so called scope 1, scope 2 and scope 3 parts. Scope 1 comprises all greenhouse gas emissions of the company's own operations (production, power plants and waste incineration). Scope 2 comprise emissions from energy production which is sourced externally. Scope 3 comprise all other emissions along the value chain. Specifically, this includes the greenhouse gas emissions of raw materials obtained from suppliers. PCF sum up greenhouse gas emissions and removals from the consecutive and interlinked process steps related to a particular product. Cradle-to-gate PCF sum up greenhouse gas emissions based on selected process steps: from the extraction of resources up to the factory gate where the product leaves the company. Such PCFs are called partial PCFs. In order to achieve such summation, each company providing any products must be able to provide the scope 1 and scope 2 contributions to the PCF for each of its products as accurately as possible, and obtain reliable and consistent data for the PCFs of purchased energy (scope 2) and their raw materials (scope 3).

Traditionally, PCF are calculated manually using a model of the production process and statically attribute a value to each step. As an example, CN 108 537 434 A discloses a method to calculate a PCF. While all relevant contributions are taken into account, only theoretical and/or historical values are used as input producing the same value for each product independent of the actual situation in a plant at a given point in time. However, in a modern production plant representing a complex system of interconnected process steps, different production processes influence each other, for example because they both use steam generated by a power plant. Depending on the usage of such resources, the option to re-use waste or generated heat etc., the PCF for a particular product can change even if its production process is not changed. As an example, a reduced usage of the power plant may reduce its efficiency, so the same amount of steam produces more greenhouse gas emissions, for example because there is no use for the remaining steam, but the power plant output cannot be reduced because the electricity demand is unchanged.

In order to calculate the scope 1 and scope 2 emissions of a product, a company has to source and process primary data from a potentially very high number of consecutive and interlinked process steps related to a particular product in its own production process. This makes the determination of PCFs for the companies' products very expensive and time-consuming. Moreover, existing standards for PCF determination leave room for choices and interpretation, and there is no unique and unambiguous method how to allocate the scope 1 and scope 2 emissions of production plants to individual products. Traditionally PCFs are calculated only case-by-case by individual experts—hence, this bears a high risk of making inconsistent methodological choices. Therefore, comparability of the resulting PCFs stemming from different sources and/or produced at different points in time is currently not given. One particular example for a methodological choice is the allocation of GHG to co-products, which cannot be obtained alone, but only together from one single process step, such as different fractions of hydrocarbons obtained from the steam cracking process.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY OF THE DISCLOSURE

Figure 1:
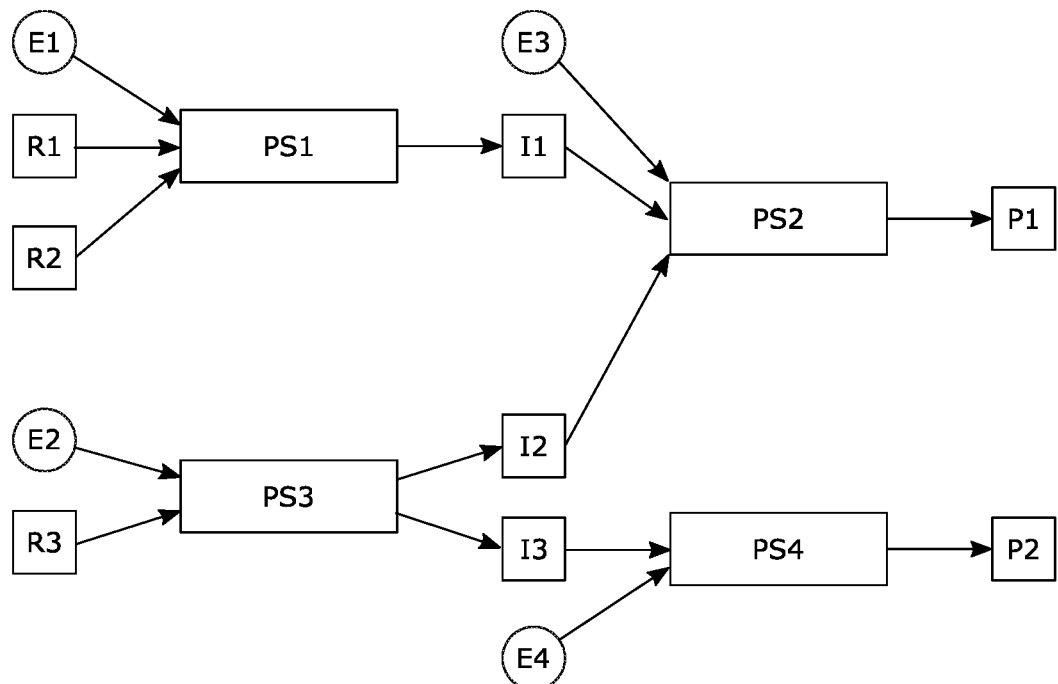
FIG. 1 illustrates a multi-stage production process for producing products from raw materials.

It is an objective to provide a method for determining the carbon footprint of a product based on the actual situation of the production processes in a production plant at a given point in time, in particular in production plants with interconnected production processes. Moreover, the method should be fast in order to allow for frequent updates of PCFs based on actual process data to show how adjustments in the production process influence the PCFs. The method is targeted to help minimizing the carbon footprint of the products of a production plant. In particular, it should be possible to analyze each contribution to the carbon footprint and monitor any changes thereof. Another objective is to make sure that one single methodology is used to calculate the PCF consistently for all products of a production plant.

These objectives and others were achieved by a computer-implemented method for determining a carbon footprint of a product produced in production process of a production plant comprising:

(a) gathering process data comprising information about the process steps from the required raw materials to the product, and/or (b) gathering the carbon footprint of each raw material, and/or (c) gathering energy data comprising information about the energy consumption for each process step, (d) determining the carbon footprint of the product taking into account the process data, the carbon footprint of each raw material and/or the energy data, and (e) outputting the carbon footprint of the product obtained in step (d), preferably outputting the carbon footprint of the product and/or each contribution to it as obtained in step (d).

In other words, a computer-implemented method for determining a carbon footprint of a product produced in a production process of a production plant is presented, the method comprising:

(a) gathering process data comprising information about one or more process step(s) from the raw materials to the product, and/or (b) gathering the carbon footprint of one or more raw material(s), and/or (c) gathering energy data comprising information about the energy consumption for one or more process step(s), (d) determining the carbon footprint of the product taking into account the process data, the carbon footprint of each raw material and/or the energy data, and (e) outputting the carbon footprint of the product obtained in step (d).

In some embodiments, the present invention further relates to the use of the carbon footprint obtained by the method of the present invention for calculating and/or optimizing carbon footprints or downstream products.

In some embodiments, the present invention further relates to a non-transitory computer readable data medium storing a computer program including instructions for executing steps of the method according to the present invention. The present invention further relates to a computer program product including instructions, which when executed perform the steps of the method according to the present invention. The present invention further relates to a non-transitory computer readable data medium storing instructions, which when executed perform the steps of the method according to the present invention.

In some embodiments, the present invention further relates to a system or apparatus for determining the carbon footprint of a product produced in a production process of a production plant comprising:

(a) an input or input unit configured to receive (i) process data comprising information about the process steps from the required raw materials to the product, (ii) the carbon footprint of each raw material, and/or (iii) energy data comprising information about the energy consumption for each process step, (b) a processor or processing unit configured to determining the carbon footprint of the product taking into account the at least one of the information gathered in step (a), and (c) an output or output unit configured to output the carbon footprint of the product as obtained from the processor or processing unit, preferably an output unit configured to output the carbon footprint of the product and/or each contribution to it as obtained from the processor or processing unit.

In other words a system for determining a carbon footprint of a product produced in a production plant is presented, the system comprising:

(a) an input configured to receive (i) process data, wherein the process data comprises information about one or more process step(s) from raw materials to the product, (ii) the carbon footprint of one or more raw material(s), and/or (iii) energy data comprising information about the energy consumption for one or more process step(s), (b) a processor configured to determine the carbon footprint of the product taking into account the information gathered in step (a), and (c) an output configured to output the carbon footprint of the product determined by the processor.

DETAILED DESCRIPTION

In some embodiments, a method according to the present invention determines the carbon footprint of products. In the context of the present invention, "carbon footprint" relates to the amount of greenhouse gases emitted or removed in a production process of a production plant. The carbon footprint may relate to the total amount of greenhouse gases emitted or removed in the production process e.g. from extracting natural resources to the product as it leaves the production plant. In the context of the present invention, the carbon footprint may not include any greenhouse gas emission later on in the lifetime of a product. For example, for a car the carbon footprint in the context of the present invention is the amount of greenhouse gases emitted to produce the car, but not the emissions caused by using the car once it has left the production plant. The amount of the carbon footprint is typically expressed as carbon dioxide equivalents, so the amount of carbon dioxide with the same effect on global climate as the actually emitted greenhouse gases.

Greenhouse gases may comprise carbon dioxide, carbon monoxide, nitrous oxide, methane, ozone, chlorofluorocarbons, hydrofluorocarbons. These can be translated into carbon dioxide equivalents according to IPCC $5^{th}$ assessment report (cf. standards such as ISO 14067 for carbon footprint of products or the Greenhouse Gas Protocol Product Standard WRI & WBCSD, 2011).

In some embodiments, the methods of the present invention can be applied to a wide variety of products which are produced from raw materials, such as chemical products or precursor products. The term "product" as used in the present invention generally refers to any good which can be sold to others at any point in the value chain. This may include final products for end consumers, for example cars, paints, toys or medicaments; this may also include goods which are typically sold to other companies which further process them, for example steel parts for machines, plastic pellets for extrusion or chemical compounds, for example acrylic acid to produce superabsorbers for diapers; this may also include goods very early in the value chain like crude oil fractions, for example naphtha, agricultural products, for example soy beans, or purified sand for glass production.

The term "raw material" as used in the present invention refers to any good which is bought from suppliers and brought to the production plant. The raw material may include starting material used in the production process of the production plant to produce the product. A raw material can be on any step along the value chain like the product described above. This means, the product of the one production plant can be the raw material of the other production plant. Raw material can also include very fundamental goods like air, water, natural gas or salt.

A "production plant" as used in the present invention is any facility which is able to produce any kind of good which is sold to an end customer or further processed in a different production plant. A production plant can be on one single site or on multiple. If the production plant is in multiple sites, these have to be under common control which is typically the case if they belong to the same company or to affiliated companies. Examples for plants are power plants, steel manufacturing plants, oil producing plants, oil refineries, chemical plants, plants for manufacturing pharmaceuticals, plants for manufacturing construction materials, machine manufacturing plants, automobile manufacturing plants, plants for manufacturing textiles, plants for manufacturing furniture, food production plants, plants for manufacturing consumer electronics such as cell phones, plants for manufacturing and/or processing of paper, such as a printing press.

In some embodiments, the present invention comprises the step (a) gathering process data comprising information about the process steps from the required raw materials to the product. A "process step" in the context of the present invention is generally a series of acts onto the raw materials which cannot be reasonably separated in time or space. Typically, all acts of one process step take place in one building using a certain dedicated equipment. The production process of the production plant may include one or more process step(s). The process data may include a digital representation of the one or more process step(s) of the production process.

The process data can comprise information which reagents are required at which amounts for each process step. The process data may comprise the digital representation of one or more process step(s) of the production process and such representation may include or may be associated with the information which reagents are required at which amounts for the one or more process step(s). A "reagent" can be a raw material or an intermediate of a different process step. An "intermediate" refers to a good, such as a substance, which is neither a raw material nor a product, but is made from raw materials or earlier intermediated and is processed further into other intermediates and finally into the product. Each process step may require one or more than one reagent(s). The "amount" of a reagent refers to the mass, the volume or the number of pieces per intermediate or product depending on the nature of the reagent, intermediate and/or product. The mass is typically used for bulk goods, such as metals. The volume is typically used for liquids, such as water or glycerol. The number of pieces is typically use for individualized goods, such as screws or plastic pieces. All these units are given per unit of intermediate or product, for example 0.5 kg of reagent 1 per kg of product.

The process data can comprise information about which by-products are obtained in which amount, e.g. for one or more process step(s). The process data may comprise the digital representation of one or more process step(s) of the production process and such representation may include or may be associated with the information which by-products are obtained in which amount for respective process step(s). Some process steps may not produce any by-products, such as the assembly of steel parts. In this case, the process data does not comprise information about by-products. However, many process steps produce by-products. A "by-product" in the context of the present invention refers to any good which is unavoidably obtained in a process step but cannot be used in a different process step. Sometimes, a by-product can be recycled, i.e. be subjected to another process step or multiple process steps to obtain a raw material or an intermediate which can be used as reagent in a process step. However, in some cases, there is no economically feasible use for the by-product. In this case, the by-product has to be disposed. It can, for example, be burned in an incineration. If the incineration is part of the production plant, the thermal and/or electrical energy regained may preferably be taken into account.

The process data can comprise the information which intermediate or intermediates are obtained in each process step and at which yield. The process data may comprise the digital representation of one or more process step(s) of the production process and such representation may include or may be associated with the information which intermediate or intermediates are obtained in the one or more process step(s) and at which yield. The "yield" in the context of the present invention refers to the percentage of outcome from a particular process step relative to the theoretical maximum. If the yield is 100%, for example if ingredients are mixed into a formulation, the process data does not have to comprise information about the yield. However, the yield can be below 100% if there are losses in a process step. In chemical reactions, the yield is typically below 100%, because of side reactions and losses upon purifications. In other processes, yields can also be below 100%, for example if steel parts are cut or drilled, the chips may cause a loss unless they can be reused.

The process data can comprise information about any direct greenhouse gas emissions by the process step. Such direct greenhouse gas emissions often stem from a chemical reaction of the raw materials which either contain greenhouse gases or generate greenhouse gases during the process step, for example by heating. A typical example is cement production in which carbon dioxide evolves from heating the raw materials, in particular from heating limestone. The process data may comprise the digital representation of one or more process step(s) of the production process and such representation may include or may be associated with information about direct greenhouse gas emissions by respective process step(s). The information about direct greenhouse gas emissions usually contains the information which greenhouse gas is emitted at which amount. The amount can be given relative to the amount of raw materials or relative to the amount of product or intermediate of the respective process step. The latter can be derived from the former by multiplying with the yield of the process step.

In the easiest case, one or multiple raw materials are processed in one process step to arrive at the product. An example could be that certain cables and plugs are the raw materials which are assembled to form a cable tree as a product which is sold to car manufacturers. In most cases, however, the production processes are more complicated. Multiple raw materials are processed into various intermediates which are processed into various products, wherein one raw material can be used to produce more than one intermediate and one intermediate may be used to produce more than one product. In such a situation, the final carbon footprint of one product become dependent on the amount of other products produced at the production plant. Hence, typically the process data comprise the information which reagents are required at which amounts for each process step for all products having at least one reagent or intermediate in common. For many production plants, the process data comprise the information which reagents are required at which amounts for each process step for at least two products having at least one reagent or intermediate in common. The process data may comprise the digital representation of one or more process step(s) of one or more production process(es). Such representation may include or may be associated with information which reagents are required at which amounts for one or more process step(s) for at least two products having at least one reagent or intermediate in common. For complex production plants the process data comprise the information which reagents are required at which amounts for each process step for at least five or at least ten products having at least one reagent or intermediate in common. The process data may comprise the digital representation of one or more process step(s) of one or more production process(es). Such representation may include or may be associated with information which reagents are required at which amounts for each process step for at least five or at least ten products having at least one reagent or intermediate in common.

An example of a more common situation is shown schematically in FIG. 1. The raw materials are denoted as R1, R2 and R3, the products are denoted as P1 and P2, the intermediates, i.e. all goods which are neither raw materials nor products, are denoted as I1, I2 and I3, the energy required for each production process are denoted as E1, E2, E3 and E4, the process steps are denoted PS1, PS2, PS3 and PS4. Raw materials R1 and R2 are processed in a first process step PS1 to produce intermediate I1 using the energy E1. In the next process step PS2, intermediate I1 is processed with intermediate I2 using the energy E3 to arrive at product P1. Intermediate I2 is also made within the same production plant in process step PS3 by processing raw material R3 using the energy E2. In process step PS3, another intermediate I3 is obtained which can be further processed in another process step PS4 using energy E4 to the other product P2. It can easily be recognized that the raw materials R1, R2 and R3 as well as the energies E1, E2 and E3 have an impact on the carbon footprint of P1. However, also the usage of I3 has an impact, because if the demand for product P2 changes, either the input of I3 cannot be used completely because of too low demand for product P2, a higher percentage of the carbon footprint of R3 and the emission due to E2 will have to be attributed to I2 and consequently P1. Therefore, it is usually necessary to provide complete information about all raw materials and all process steps in a production plant, at least in case that there are connections between different chains of process steps from raw materials to the products. The process data may comprise the digital representation of one or more process step(s) of one or more production process(es). Such representation may include or may be associated with information about raw materials and process steps in one or more production plant(s), preferably in case that there are connections between different chains of process steps from raw materials to the products.

Figure 2:
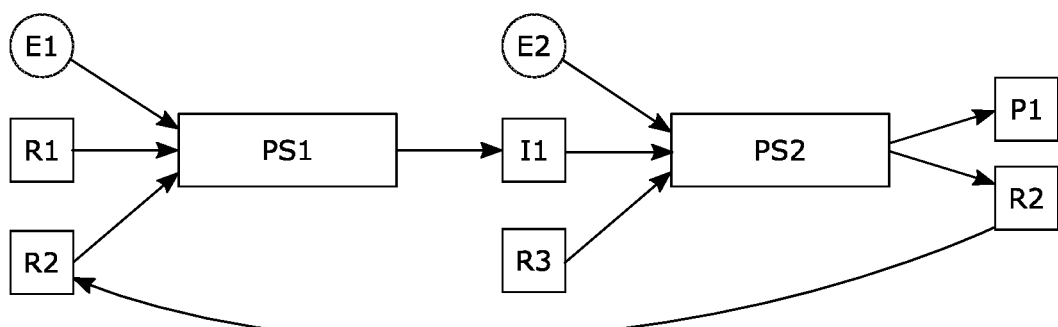
FIG. 2 illustrates a multi-stage production process illustrating the re-use of raw materials produced as a result of the process.

FIG. 2 shows another example which can particularly occur in the chemical industry. Raw materials R1 and R2 are processed in a first process step PS1 to produce intermediate I1 using the energy E1. In the next process step PS2, intermediate I1 and raw material R3 are processed using the energy E2 to arrive at product P1 while the reagent R2 is also obtained. R2 can be reused in process step PS1, so a cycle is formed. In this situation, the process data may contain information on how much of reagent R2 is used from a supplier and how much recycled reagent R2 obtained in process step PS2 is used.

The process data is typically gathered through an interface. The process data may be gathered from the production plant. It can be gathered through an interface to a local or a remote database. Preferably, the process data is gathered through an interface to an enterprise resource planning (ERP) system or any computing system or apparatus, such as a centralized or decentralized computing system or apparatus including processing and storage. In this way, the process data may be gathered from the ERP system or any computing system or apparatus. The ERP system or any computing system or apparatus may obtain the information from the production plant. In this case, the process data may by gathered from the production plant via the ERP system or any computing system or apparatus. In this way, the process data may be updated or instantly updated once any change in the production plant or its surrounding occurs. Depending on the ERP system or the computing system or apparatus "instantly" may mean in less than or equal to one day, preferably less than or equal to six hours, in particular less than or equal to one hour. A typical example of such a change would be that the production plant receives insufficient reagent from a different factory and has to use an external supply instead. Such an external supply usually has a different product carbon footprint than the internal intermediate, hence changing the carbon footprint of the product produced in the production plant. Another advantage of an ERP is system is that the data is standardized and validated, i.e. it is reliable and typically does not need further validation.

An "ERP system" in the context of the present invention shall have its common meaning. A typical ERP system provides an integrated and continuously updated view of core business processes using common databases maintained by a database management system. ERP systems typically track business resources such as cash, raw materials, production capacity and the status of business commitments: orders, purchase orders, and payroll. The applications that make up the system typically share data across various departments such as those responsible for manufacturing, purchasing, sales, accounting, that provide the data.

Preferably, in particular for more complex production processes, in particular for interconnected production processes, the method of the present invention, in some embodiments, further comprises subdividing the production process into at least two process steps based on the process data. Such a process is typically needed if the process data is not available in a format which attributes all information directly to a process step, but is only available in a format from which this information is derivable.

As an example, the process data gathered from the production plant may contain the materials used as starting materials and the products produced, but not the information which process step uses as starting material the product of which other process step. Therefore, the method of the present invention, in some embodiments, preferably further contains determining for each process step which process step precedes this process step based on the amount of a particular starting material used in this process step and the amount of the same material produced by other process steps. This can be achieved by identifying for each material, for example by a material identifier, all process steps which produce this material and all process steps which use this material as starting material. These process steps need to be connected. If more of a particular starting material is used in a process step than produced by the other process steps, this difference can be identified as raw material. The result can be validated by comparing the amount of raw material of a certain material with the procurement information of this raw material. Such procurement information can typically be obtained from the ERP system.

If the production plant(s) comprise multiple entities such as group companies, for example in different countries, the different entities such as group companies often use separate ERP systems or any computing system or apparatus, such as a centralized or decentralized computing system or apparatus including processing and storage. If an intermediate produced by one entity is shipped to another entity using this intermediate in another process step, the ERP systems or any computing system or apparatus, such as a centralized or decentralized computing system or apparatus including processing and storage may treat such operations as external transactions for legal reasons. However, for the purpose of the present invention, such data may be consolidated to identify intermediates produced by one group company and used by a different group company. Such information may be accessible from the ERP systems or may require other data sources, such as a shared database. Hence, preferably the process data is gathered through an interface to ERP systems or any computing system or apparatus of different group companies, wherein the process data is consolidated to identify intermediates produced by one group company and used by a different group company. The process data may be gathered through an interface to different production plants, preferably different computing or storage resources communicatively connected to the different production plants. The process data may be gathered through an interface to enterprise resource planning systems of different group companies, The process data may be consolidated to identify intermediates produced by one group company and used by a different group company.

Certain embodiments of the present invention comprise (b) gathering the carbon footprint of each raw material. For most raw materials, the carbon footprint can be obtained from the supplier provides or from public or private databases. Usually, different suppliers provide the same raw material with different carbon footprint due to differences in its production process or logistics. Therefore, preferably, the carbon footprints of a raw material are gathered for each supplier together with an identifier of the supplier. This information can then be used to calculate the carbon footprint of that particular raw material depending on how much of the raw material is used from which supplier. The result can be taken into account for determining the carbon footprint in the method of the present invention. In rare cases, no carbon footprints are available. In this case, the carbon footprint may be estimated, for example by comparison to very similar products on the market. The carbon footprint of each raw material is typically gathered through an interface. The carbon footprint of each raw material can be gathered through an interface to a local or a remote database or an ERP system, in particular its supply chain module, or any computing system or apparatus, such as a centralized or decentralized computing system or apparatus including processing and storage. The carbon footprint of each raw material may hence be gathered from an ERP system or any computing system or apparatus, such as a centralized or decentralized computing system or apparatus including processing and storage. Usually, the carbon footprint of each raw material is gathered through an interface to more than one database. It is therefore often necessary to convert the information retrieved from different databases into a single format to allow further processing. In particular, the carbon footprints obtained from databases have to be attributed to the raw material, i.e. the identification of a raw material in the database has to be translated to the identification of the raw material of the process data used in the process according to the present invention.

Certain embodiments of the present invention comprise (c) gathering energy data comprising information about the energy consumption for each process step. Energy data typically comprises the amount of energy consumed, the energy form and its origin. The amount is often given as specific energy per piece or mass of the product or intermediate of that respective process step. The amount can be positive, i.e. if the energy is consumed, or negative, i.e. if the process step produces energy. An example for the latter is the production of sulfuric acid from sulfur. Sulfur is reacted with oxygen releasing thermal energy which can be used in a different process step. The energy form includes electricity, thermal energy, such as warm water or steam, cooling or fossil fuels such as gas or petrol. In the case of fossil fuels, these are also raw materials, but their carbon footprint only refers to the greenhouse gas emission for producing these. However, the exhaustion of carbon dioxide upon burning these may be taken into account as well. The origin of the energy refers to source where the energy is taken from. For example, thermal energy can originate from power plants, from other process steps or from solar panels. Hence, the origin can have a considerable effect on the greenhouse gas emission associated with the energy consumption. It can be useful to average energy data over a certain period of time, for example over a period of 3 years, to compensate for example seasonal variations. The energy data is usually transformed into carbon footprints by taking into account the energy sources and their specific greenhouse gas emissions.

The energy data is typically gathered through an interface. The energy data can be gathered through an interface to a local or a remote database or an ERP system or any computing system or apparatus, such as a centralized or decentralized computing system or apparatus including processing and storage. The energy data may hence be gathered from an ERP system or any computing system or apparatus, such as a centralized or decentralized computing system or apparatus including processing and storage. Usually, the energy data is gathered through an interface to more than one database. It is therefore often necessary to convert the information retrieved from different databases into a single format to allow further processing.

The energy data can also be available directly or indirectly from the energy source, for example a power plant having sensors attached to a processing system which provides its information through an interface. The production plant usually also has sensors to determine the amount of energy consumed by or from the power plant. Often, a production plant has multiple sensors providing data about the energy consumption of a certain process step or certain equipment. Hence, the energy data may be gathered directly or indirectly from the energy source and/or from the production plant. In many production plants, however, such information, namely the energy data, is first transferred to an ERP system or any computing system or apparatus, such as a centralized or decentralized computing system or apparatus including processing and storage from which it can be gathered. This means, the sensors for determining the energy consumption transfer their data to the ERP system or any computing system or apparatus, such as a centralized or decentralized computing system or apparatus including processing and storage from which it can be gathered.

Commonly, in particular for larger production plants, multiple energy sources are available. For example, the production plant is on a larger site which has a power plant, such as a gas power plant or solar panels, and in addition the production plant can obtain energy from a public power grid. Depending on the energy source the contribution to the product carbon footprint can be quite different, for example essentially no contribution if the energy is received from a solar panel or a wind turbine or a significant contribution if the energy is received from a public power grid which provides energy from coal power plants. Therefore, preferably, the energy data also comprises information about the source the energy is received from. This information is typically obtained from sensors in the production plant or in a central power supply facility. The energy data preferably contains information of the carbon emissions caused by each energy source from which energy is received. In this way, it is possible to calculate the contribution of the energy to the product carbon footprint.

The energy data may not be readily available for each process step, but may only be available in more aggregated form, for example the energy consumption of a factory in which multiple process steps are executed. In this case, the energy consumption for each process step has to be derived from such aggregated data. This can be achieved by determining the share of the energy consumption of each process step in the aggregated data. To this end, a suitable basis is defined, for example, in a simple approach, based on the share of the production volume, for example measured in physical quantity such as mass, of each of the process steps. A more precise way of allocating the energy consumption is by using data about the energy-related production costs at the product level, obtained for example from an ERP system.

The steps (a), (b) and (c) can be performed consecutively or in parallel. It is also possible to perform two steps in parallel and the remaining step before or after. If the steps are performed consecutively, they can be performed in any order, such as first step (a), second step (b) and third step (c) or first step (a), second step (c) and third step (b) or first step (b), second step (a) and third step (c) or first step (b), second step (c) and third step (a) or first step (c), second step (a) and third step (b) or first step (c), second step (b) and third step (a). Preferably, the steps are performed in parallel.

In some embodiments, the process according to the present invention further comprises (d) determining the carbon footprint of the product taking into account the process data, the carbon footprint of each raw material and the energy data.

Determining the carbon footprint of the product comprises summation of the carbon footprints of each raw material used in a particular process step as contained in the process data from step (a). If a process step requires an intermediate from a different process step, the sum of the carbon footprint of the raw material for this earlier process step is determined and used as input for the later process step. It may be necessary to repeat this if the earlier process step again uses an intermediate of an even earlier process step. If one process step yields more than one intermediate, for example two or three, it is necessary to share the carbon footprint of the raw materials among these intermediates. The share for each intermediate should reflect the raw material usage for each intermediate. In some cases, two intermediates are formed at the same amount, so the carbon footprint of the raw materials can be equally shared among them. In other cases, significantly more of one intermediate is formed than the other, for example 90% of intermediate 1 and 10% of intermediate 2. The carbon footprint should be shared accordingly. Hence, preferably, in the method of the present invention determining the carbon footprint involves, in some embodiments, calculating the carbon footprint for an intermediate produced in a preceding process step and using the carbon footprint of the intermediate as input for the calculation of the carbon footprint of a subsequent process step. In particular, in interconnected production processes, the calculation of the carbon footprint can be facilitated by subdividing it into analogous calculation parts, one for each process step.

It has to be noted that the aforementioned approach of using the already determined carbon footprint for an intermediate as input for the calculation of the carbon footprint of a subsequent process step has the advantage that even the same calculation algorithm or formula can be used for the carbon footprint calculation of each process step of even a complex production process including a multitude of interconnected process steps. Furthermore, this approach allows for an improved automatization of an underlying carbon footprint calculation of an entire production process, or entire value chain respectively.

Alternatively, it is possible to first prepare a consolidated bill of materials for each process step. This means, that for each process step, all raw materials are listed which are either directly used in this process step or in any preceding process step along the chain of process steps. The amounts of these raw materials are adjusted according the usage of the intermediate and its share in a process step yielding more than one intermediate. For example, in FIG. 1 for process step PS2, the consolidated bill of materials contains the raw materials R1 and R2 at its full amount and raw material R3 multiplied by the ratio of 12/13 accounting for the fact that some raw material is also used for intermediate 13 which is not used in process step PS2. Once this consolidated bill of materials is obtained, the carbon footprint for each raw material is summed to arrive at the carbon footprint contribution of the raw materials for each process step. Hence, preferably, determining the carbon footprint comprises preparing a consolidated bill of materials for each process step to arrive at the carbon footprint contribution of the raw materials for each process step. In particular, in interconnected production processes the calculation of the carbon footprint can be facilitated by subdividing it into analogous calculation parts, one for each process step.

Determining the carbon footprint of the product can comprise adding the contribution of the energy required for each process step. For this reason, the required amount of energy may be attributed with an amount of greenhouse gas emissions. Usually, energy is provided by a distribution network, such as an electricity network or a hot water or steam network. Such networks are typically fed by different powerplants and sometimes other energy sources, for example heat generated by other process steps. In practice, it is hence not possible to determine, which portion is actually from which energy source, but only average values are accessible. Therefore, typically information about the greenhouse gas emissions are only available as average over the total energy consumption of the complete production plant. If all energy is supplied by an external supplier, such as an electricity company, the average greenhouse gas emission per energy unit is usually accessible from the energy supplier. However, in particular large production plants often own their own power plants. In this case, the amount of greenhouse gas emission of this power plant may be determined. The share of this total emission, which can be attributed to the process step under determination, can be derived from the ratio of the energy consumption of this process step divided by the total energy output or consumption of the power plant. In this way, each process step is assigned an energy carbon footprint, i.e. the amount of greenhouse gases originating from the energy usage of that process step.

It is possible to add the contribution of the energy in each process step to the carbon footprint of the raw material used in that step, so a total carbon footprint for an intermediate is obtained for the first process step along a production chain which can be used as input for the next process step. This calculation can be repeated for each following process step to arrive at the product. However, for complex interconnected processes, such an approach may be impractical.

Alternatively, preferably, the contribution of the energy for the product is determined for the product independent of the raw materials. To achieve this, the energy contribution for each process step is added according to the process data. If a process step yields more than one intermediate or the intermediate is used in more than one other process step, the contribution is shared among these, so only that part of the process step is taken into account which can be attributed to the product. For example, if one process step yields two intermediates at the same ratio and only one intermediate is used to produce the product, only half of the energy contribution of said process step is used for the determination of the energy contribution. To arrive at the total carbon footprint of the product, the contribution of the raw materials and the contribution of the energy is added. Hence, preferably determining the carbon footprint of the product comprises determining the contribution of the energy in each process step and add shares of it according to the process data.

In some cases, the process step generates energy which can be used in other process steps. Typically, such energy is heat which can be fed back into the warm water or steam network. Such energy generation can be taken into account for the carbon footprint by subtracting a value which would be emitted if the same amount of heat had to be produced by a power plant. Therefore, determining the carbon footprint of each process step further comprises subtracting greenhouse gas emissions for energy emission of the process step which is reused in other process steps.

For process steps which yield by-products, their contribution to the carbon footprint may be taken into account. Often, by-products are burnt in an incineration and thereby emitting greenhouse gases. The amount can often relatively easily be determined, for example by calculating the carbon content of the by-product which gets converted into carbon dioxide in the incineration. In some cases, the by-product can be recycled involving further process steps until the outcome can be used as new raw material or intermediate. If the recycling is done in the same production plant, the recycling process steps can be subjected to the same analysis as the production process steps yielding a carbon footprint which is added to the process step yielding the by-product. However, often the by-products are recycled by recycling companies, so said analysis is not possible. Instead, the recycling company may provide carbon footprints of the recycling process. Otherwise, a reasonable value may be estimated. Hence, determining the carbon footprint of each process step can further comprise adding the emissions caused by disposing or recycling the by-products.

For process steps which cause direct greenhouse gas emissions, these direct emissions may be added to the carbon footprint of the process step. Hence, determining the carbon footprint of each process step can further comprise adding the emissions caused by direct greenhouse gas emissions. It is also possible to determine the contribution of direct emissions for the product along the production chain analogously to the raw material contribution and the energy contribution and finally add it to the other contributions.

In some embodiments, the process according to the present invention further comprises (e) outputting the carbon footprint of the product obtained in step (d). Outputting can mean writing the carbon footprint on a non-transitory data storage medium, displaying it on a user interface, providing it to an interface for further processing or any combination thereof. It is also possible to provide the output through an interface to a customer, for example to the customers supply chain system or ERP system. It is also possible to provide the output through an interface to the EPR system of the producer itself from where it can be distributed to where this information is needed. When the carbon footprint and each contribution to it is output onto a user interface, the user interface preferably uses graph technology. In this way, it is possible to analyze the contributions along the production process in order to optimize the production process and thereby minimize the carbon footprint for the products. It is also possible to monitor changes of the carbon footprint upon changes in the production process. In addition, the output can be used to simulate effects of changes, for example by manually changing certain values and see its effect on the carbon footprint of the product. For example, the effect of replacing a particular raw material by one having lower carbon footprint for each product may be analyzed.

Preferably, the process further comprises outputting the carbon footprint for each process step as it contributes to the carbon footprint of a certain product. In this way, it is possible to analyze the contribution of each step, in particular the contribution of raw materials and energy in each step. This allows the identification of potential to reduce the carbon footprint of the product.

Embodiments of the methods according to the present invention are particularly useful for production plants which execute interconnected process steps. The term "interconnected" in the context of the present invention means that at least one process step uses two intermediates of different other process steps or uses one intermediate of different other process steps each producing this intermediate or yields two intermediates which are used in two different other process steps. Hence, preferably, the production plant executes interconnected process steps. Even more preferably, the production plant is a chemical production plant executing interconnected process steps. Often, the interconnected process steps are executed in different factories, may be on different sites, potentially operated by different group companies.

In some embodiments, the present invention further relates to the use of the carbon footprint obtained by a method of the present invention for calculating and/or optimizing carbon footprints of downstream products. Downstream products in the present context means any product which uses any one or more products for which the methods according to the present invention are executed. For example, the carbon footprint of a plastic granulate is determined by a method of the present invention. This plastic granulate is delivered to a producer of toys. This producer uses the plastic granulate to extrude the toys. The toys are in this example the downstream product. The toy producer may itself want to determine the carbon footprint of the toys. For this purpose, the producer may obtain the carbon footprint of the plastic granulate as determined by a method of the present invention and use it for calculating the carbon footprint of the toy. The producer may itself use the methods of the present invention, but may equally use a different method.

The carbon footprint obtained by the methods of the present invention can also be used for optimizing the carbon footprint of downstream products. The carbon footprint can, for example, be entered into a database together with other information about the product, such as the producer, the specifications, the price, or the availability. In this way, a manufacturer of downstream products may search for products having low carbon footprints such that they contribute little to the carbon footprint of the downstream product and hence optimize the carbon footprint of the downstream product.

In some embodiments, the present invention further relates to an apparatus configured for or a method for providing the carbon footprint obtained by the method of the present invention in connection with a product identifier. Such product identifier may be associated with the raw material of the production process for downstream products. In some embodiments, the present invention further relates to an apparatus configured for a method for calculating and/or optimizing carbon footprints of downstream products based on the carbon footprint obtained by the method of the present invention.

In some embodiments, the present invention further relates to a non-transitory computer readable data medium storing a computer program including instructions for executing steps of the methods according to the present invention. Computer readable data medium include hard drives, for example on a server, USB storage device, CD, DVD or Blu-ray discs. The computer program may contain all functionalities and data required for execution of the methods according to the present invention or it may provide interfaces to have parts of the method processed on remote systems, for example on a cloud system.

In some embodiments, the present invention further relates to a system or apparatus for determining the carbon footprint of a product produced in a production process of a production plant. Unless explicitly described differently hereafter, the description relating to the method including preferred embodiments also applies to the system or apparatus. The system or apparatus can be a computing device, for example a computer, tablet, or smartphone, or a distributed computing system or apparatus or apparatus such as a cloud system. Often the computing device has a network connection in order to communicate with other computing devices, such as servers or a cloud network.

In some embodiments, the system or apparatus according to the present invention comprises (a) an input or input unit configured to receive (i) process data comprising information about the process steps from the required raw materials to the product, (ii) the carbon footprint of each raw material, and (iii) energy data comprising information about the energy consumption for each process step. Preferably the input or input unit has an interface to an ERP system or any computing system or apparatus, such as a centralized or decentralized computing system or apparatus including processing and storage to obtain the information. Preferably, the input or input unit is configured to receive (i), (ii), (iii) in parallel. In complex production plants, in particular in those involving multiple group companies, the data may not be available from a single data system, but from various. Depending on the compatibility of the different data systems, it may be necessary that the input comprises an interface to a system which collects the data from different sources and converts them into a common data format. In particular, the input comprises an interface to a consolidation system which collects process data from more than one ERP system or computing system or apparatus, such as a centralized or decentralized computing system or apparatus including processing and storage, wherein the consolidation system consolidates the process data to identify intermediates produced by one group company and used by a different group company. The input or input unit may comprise an interface to a consolidation system which collects process data from different production plant(s). The consolidation system consolidates the process data to identify intermediates produced by different production plants.

In some embodiments, the system or apparatus according to the present invention comprises (b) a processor or processing unit configured to determining the carbon footprint of each process step taking into account the information gathered in step (a) and consolidating the carbon footprint thus obtained to arrive at the carbon footprint of the product. The processor or processing unit may be a local processor comprising a central processing unit (CPU) and/or a graphics processing units (GPU) and/or an application specific integrated circuit (ASIC) and/or a tensor processing unit (TPU) and/or a field-programmable gate array (FPGA). The processor or processing unit may also be an interface to a remote computer system such as a cloud service.

Figure 5:
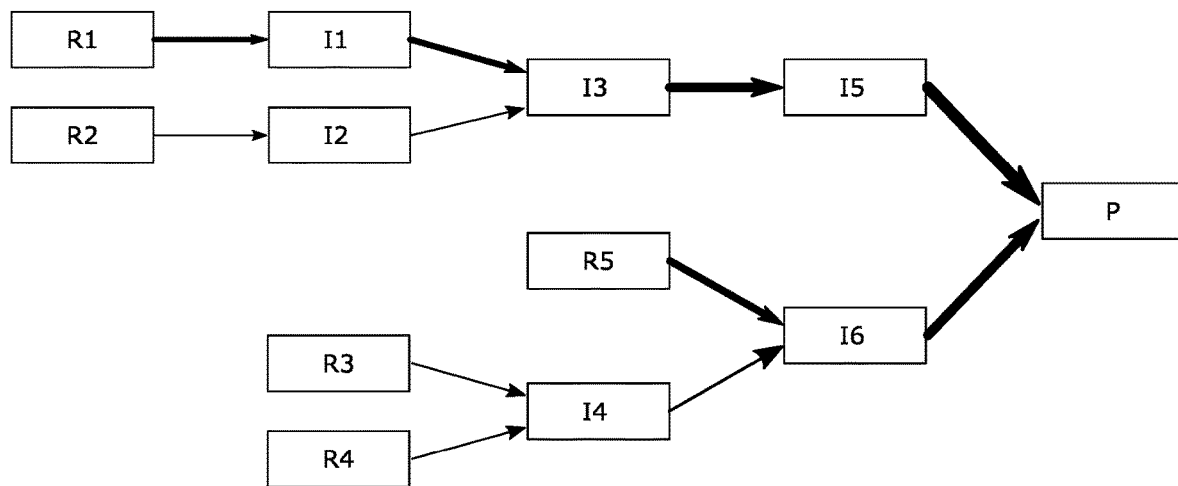
FIG. 5 illustrates an example of how a user interface could be configured in accordance with one or more embodiments of the present disclosure.

In some embodiments, the system or apparatus according to the present invention comprises (c) an output or output unit configured to output the carbon footprint of the product, preferably the carbon footprint of the product and each contribution to it as obtained from the processor or processing unit. Preferably, the output or output unit has an interface to an ERP system or a computing system or apparatus, such as a centralized or decentralized computing system or apparatus including processing and storage. Preferably, the output or output unit comprises a user interface, in particular a graphical user interface. The user interface is preferably configured to display the carbon footprint of the product and each contribution, preferably comprising the contribution of the raw materials, the contribution of the energy, and the contribution of the direct emissions of each process step. Preferably, the user interface is configured to use graph technology. The user interface may be configured to provide an overview of each process step, its raw materials and energy required, the connection with other process steps. The user interface may also provide the carbon footprint for each process step, in particular it may be configured to display the carbon footprint originating from the raw materials, from the energy consumption, and from the direct greenhouse gas emissions separately and in aggregated form. FIG. 5 shows schematically an example of how the user interface could be configured. The raw materials and the intermediates to the product are displayed according to the chain of interconnected process steps. The arrows represent process steps. Their width reflects the amount of greenhouse gases the respective process step contributes to the carbon footprint of the product. It may be possible to display further information when hovering over a box or an arrow with the mouse pointer, for example specifics about the raw material, intermediate or product or the exact value of the greenhouse gas emission. Preferably the carbon footprints are displayed in aggregated form showing the contributions of the raw materials, the energy usage and direct greenhouse gas emissions.

Preferably, the system is adapted to receive updated data at any time and can update the output or carbon footprint and/or its contributions in real time, which usually means within less than a few minutes, preferably within less than a minute, for example within 1 to 30 seconds.

Figure 3:
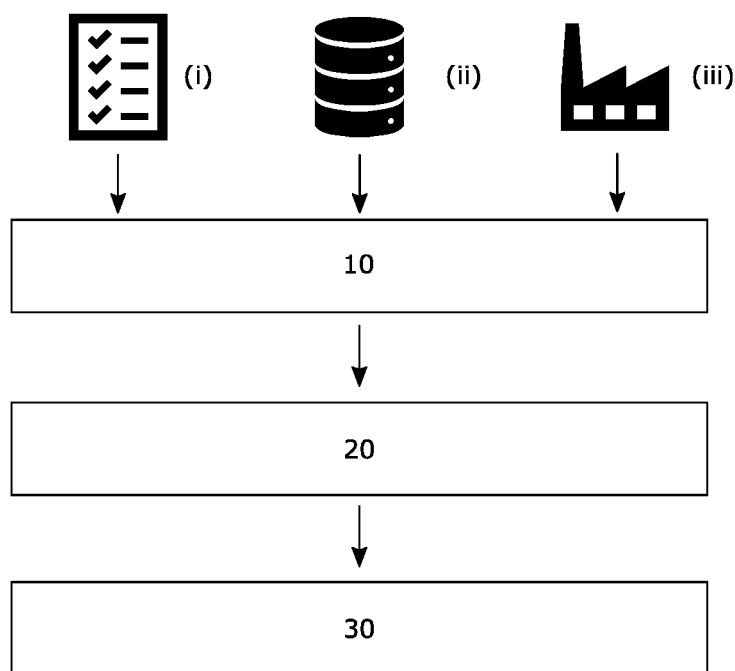
FIG. 3 illustrates a schematic view of a system in accordance with one or more embodiments of the present disclosure.

FIG. 3 shows a schematic view of the system. The input or input unit 10 is configured to receive (i) process data comprising information about the process steps from the required raw materials to the product, (ii) the carbon footprint of each raw material, and (iii) energy data comprising information about the energy consumption for each process step. Processor or Processing unit 20 is configured to determining the carbon footprint of each process step taking into account the information obtained from the input unit 10 and consolidating the carbon footprints thus obtained to arrive at the carbon footprint of the product. Output or output unit 30 is configured to output the carbon footprint of the product and each contribution to it as obtained from the processing unit.

Figure 4:
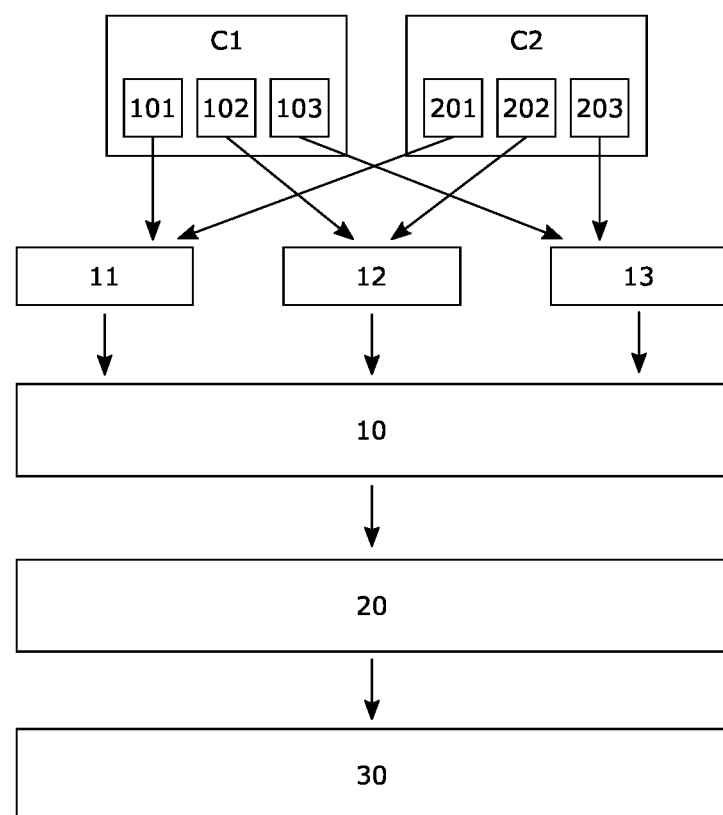
FIG. 4 illustrates a schematic view of a system comparable to that of FIG. 3 that further involves two group companies in accordance with one or more embodiments of the present disclosure.

FIG. 4 shows a schematic view of a system comparable to that in FIG. 3, but the production plant involves two group companies C1 and C2. Each group company provides process data 101, 201, the carbon footprint of each raw material 102, 202 and energy data 103, 203 through an interface to consolidation systems 11, 12, 13. The consolidation system 11 consolidates the process data to identify intermediates produced by one group company and used by a different group company. The consolidation system 12 consolidates the carbon footprint of each raw material 102, 202 to arrive at one list of raw material with associated carbon footprint. The consolidation system 13 consolidates the energy data 103, 203 to arrive at a uniform data set of energy data.

Figure 6:
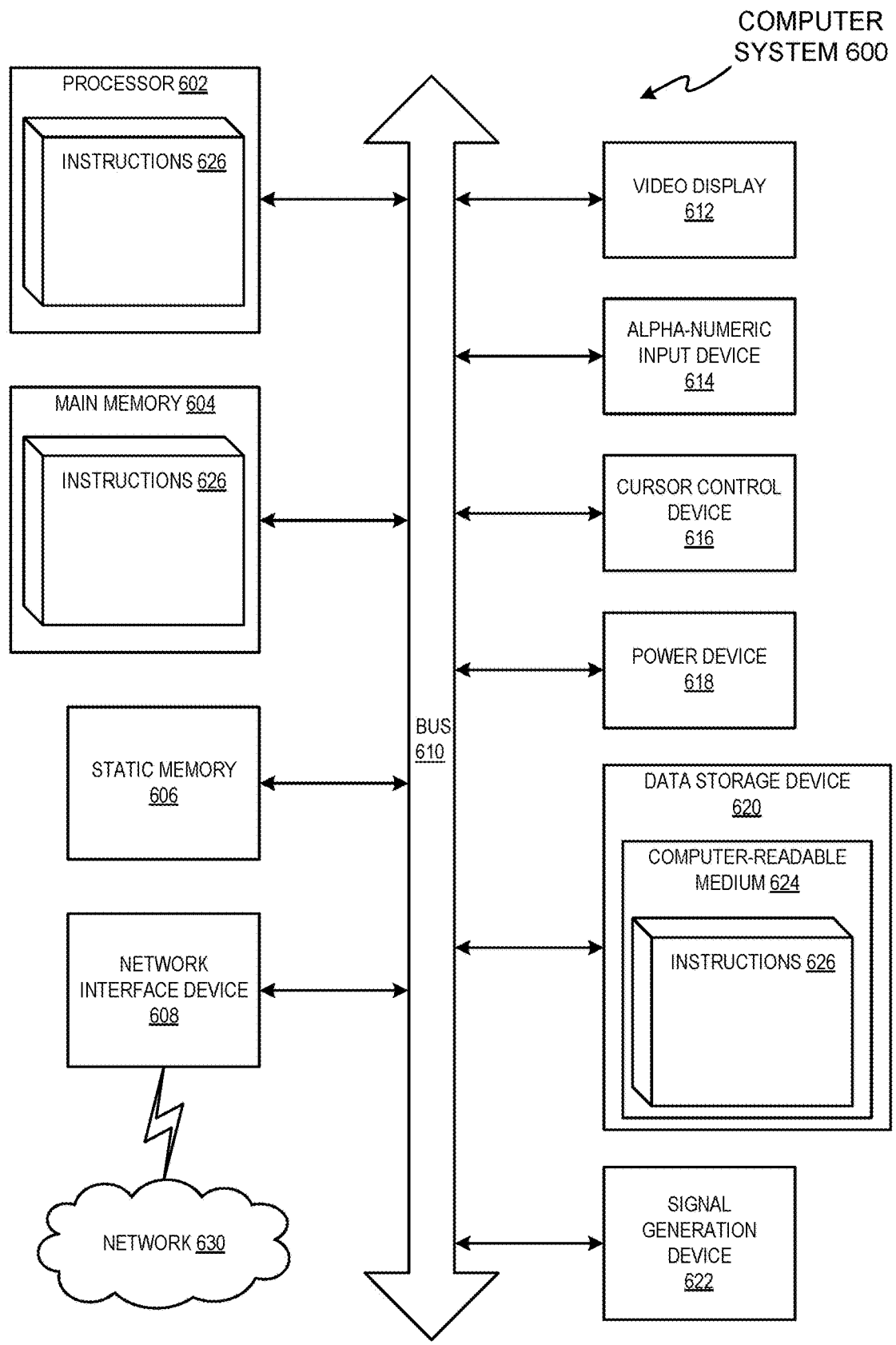
FIG. 6 is a block diagram illustrating an exemplary computer system for use in accordance with one or more embodiments of the present disclosure.

FIG. 6 illustrates a diagrammatic representation of a machine in the exemplary form of a computer system 600 within which a set of instructions (e.g., for causing the machine to perform any one or more of the methodologies discussed herein) may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 600 may be utilized by or illustrative of at least some of the devices utilized to perform the various methods of the present invention.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 620, which communicate with each other via a bus 610.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an ASIC, a field programmable gate array (FPGA), a digital signal processor (DSP), network processor, or the like. The processor 602 is configured to execute instructions 626 for performing the operations and steps discussed herein.

The computer system 600 may further include a network interface device 608. The computer system 600 also may include a video display unit 612 (e.g., a liquid crystal display (LCD), a cathode ray tube (CRT), or a touch screen), an alphanumeric input device 614 (e.g., a keyboard), a cursor control device 616 (e.g., a mouse), and/or a signal generation device 622 (e.g., a speaker).

Power device 618 may monitor a power level of a battery used to power the computer system 600 or one or more of its components. The power device 618 may provide one or more interfaces to provide an indication of a power level, a time window remaining prior to shutdown of computer system 600 or one or more of its components, a power consumption rate, an indicator of whether computer system is utilizing an external power source or battery power, and other power related information. In at least one embodiment, indications related to the power device 618 may be accessible remotely (e.g., accessible to a remote back-up management module via a network connection). In at least one embodiment, a battery utilized by the power device 618 may be an uninterruptable power supply (UPS) local to or remote from computer system 600. In such embodiments, the power device 618 may provide information about a power level of the UPS.

The data storage device 620 may include a computer-readable storage medium 624 on which is stored one or more sets of instructions 626 (e.g., software) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network 630 via the network interface device 608.

While the computer-readable storage medium 624 is shown in an exemplary embodiment to be a single medium, the terms "computer-readable data storage medium" or "machine-readable data storage medium" should be taken to include a single medium or multiple media (e.g., a centralized or distributed database, and/or associated caches and servers) that store the one or more sets of instructions. The terms "computer-readable data storage medium" or "machine-readable data storage medium" shall also be taken to include any transitory or non-transitory medium that is capable of storing, encoding or carrying a set of instructions for execution by the machine and that cause the machine to perform any one or more of the methodologies of the present disclosure. The term "computer-readable data storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "gathering," "outputting," "configuring," "receiving," "converting," "causing," "streaming," "applying," "masking," "displaying," "retrieving," "transmitting," "computing," "generating," "adding," "subtracting," "multiplying," "dividing," "selecting," "parsing," "optimizing," "calibrating," "detecting," "storing," "performing," "analyzing," "determining," "enabling," "identifying," "modifying," "transforming," "aggregating," "extracting," "running," "scheduling," "processing," "capturing," "evolving," "fitting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus, device, or system for performing the operations herein. This apparatus, device, or system may be specially constructed for the required purposes, or it may include a general purpose computer selectively activated or reconfigured by a computer program stored in the computer. Such a computer program may be stored in a computer- or machine-readable storage medium, such as, but not limited to, any type of disk including floppy disks, optical disks, compact disk read-only memories (CD-ROMs), and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "certain embodiments," "one embodiment," "at least one embodiment," or the like means that a particular feature, structure, or characteristic described in connection with the embodiment is included in at least one embodiment. Thus, the appearances of the phrase "certain embodiments," "one embodiment," "at least one embodiment," or the like in various places throughout this specification are not necessarily all referring to the same embodiment.

The present disclosure is not to be limited in scope by the specific embodiments described herein. Indeed, other various embodiments of and modifications to the present disclosure, in addition to those described herein, will be apparent to those of ordinary skill in the art from the description and accompanying drawings. Thus, such other embodiments and modifications are intended to fall within the scope of the present disclosure. Further, while the present disclosure has been described in the context of a particular embodiment in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. An apparatus for determining a carbon footprint of a product produced in a production process of a production plant, the apparatus including an input including an interface to a consolidation system, at least one processor for executing processor-executable instructions that, in response to execution, enable the apparatus to perform actions comprising:

(a) gathering process data comprising information about one or more process step(s) from raw materials to the product;

(b) gathering the carbon footprint of one or more raw material(s);

(c) gathering energy data comprising information about energy consumption for one or more process step(s);

(d) determining the carbon footprint of the product taking into account the process data, the carbon footprint of each raw material and/or the energy data; and (e) outputting the carbon footprint of the product obtained in step (d); and an output including a graphical user interface, wherein the graphical user interface presents for display a visual representation of the one or more raw material(s) and intermediates as a chain of interconnected process steps, and wherein a visual characteristic of each visual representation corresponds to an amount of greenhouse gas the respective process step contributes to the carbon footprint of the product, wherein each process step of the interconnected process steps is represented by an arrow displayed in the graphical user interface, wherein each arrow has a width that reflects an amount of greenhouse gases in a respective process step that contribute to the carbon footprint of the product that are generated as a result of each respective process step, wherein further information is displayed when hovering over each arrow to provide information about one or more of the raw material, intermediate, product, or exact value of the greenhouse gas emission of each process step, and wherein the width of each arrow reflecting the amount of greenhouse gases associated with a respective process step is updated based on the gathered process data in the graphical user interface.

2. The apparatus according to claim 1, wherein the actions further comprise subdividing the production process into at least two process steps based on the process data.

3. The apparatus according to claim 1, wherein determining the carbon footprint involves calculating the carbon footprint for an intermediate produced in a preceding process step and using the carbon footprint of the intermediate as input for the calculation of the carbon footprint of a subsequent process step.

4. The apparatus according to claim 1, wherein determining the carbon footprint involves preparing a consolidated bill of materials for each process step, wherein the bill of materials lists all raw materials which are either directly used in this process step or in any preceding process step, wherein amounts of these raw materials are adjusted according the usage of the intermediate produced in a preceding process step.

5. The apparatus according to claim 1, wherein the actions further comprise determining for each process step which process step precedes this process step based on the amount of a particular starting material used in this process step and the amount of the same material produced by other process steps.

6. The apparatus according to claim 1, wherein the process data is gathered from the production plant via a centralized or decentralized computing apparatus.

7. The apparatus according to claim 1, wherein the energy data is gathered from the energy source or the production plant via a centralized or decentralized computing apparatus.

8. The apparatus according to claim 1, wherein the carbon footprints of a raw material are gathered for each supplier together with an identifier of the supplier and wherein determining the carbon footprint takes into account the amount of raw material from a particular supplier and its associated carbon footprint.

9. The apparatus according to claim 1, wherein the production plant executes interconnected process steps.

10. The apparatus according to claim 1, wherein the process data comprises the information which reagents are required at which amounts for each process step, information about which by-products are obtained in which amount, information which intermediate or intermediates are obtained in each process step and at which yield, information about any direct greenhouse gas emissions by the process step or any combination thereof.

11. The apparatus according to claim 1, wherein determining the carbon footprint comprises preparing a consolidated bill of materials for each process step to arrive at the carbon footprint contribution of the raw materials for each process step.

12. The apparatus according to claim 1, wherein determining the carbon footprint of the product comprises determining the contribution of the energy in each process step and adding shares of it according to the process data.

13. The apparatus according to claim 1, wherein the process data is gathered through an interface to different production plants, preferably different computing or storage resources communicatively connected to the different production plants.

14. An apparatus configured to use the carbon footprint determined by the apparatus of claim 1 for calculating and/or optimizing carbon footprints of downstream products and/or in connection with a product identifier.

15. A system for determining a carbon footprint of a product produced in a production plant comprising:
(a) an input configured to receive (i) process data, wherein the process data comprises information about one or more process step(s) from raw materials to the product, (ii) the carbon footprint of one or more raw material(s), and/or (iii) energy data comprising information about energy consumption for one or more process step(s);
(b) a processor configured to determine the carbon footprint of the product taking into account the information gathered in step (a); and
(c) an output configured to output the carbon footprint of the product determined by the processor, wherein the input comprises an interface to a consolidation system which collects process data from different production plant(s), and wherein the consolidation system consolidates the process data to identify intermediates produced by different production plants, and
wherein the output comprises a graphical user interface configured to display a visual representation of the carbon footprint of the product and of one or more contribution(s) comprising the contribution of the raw materials, the contribution of the energy, and/or the contribution of the direct emissions of each process step as a chain of interconnected process steps, wherein a visual characteristic of each visual representation corresponds to an amount of greenhouse gas the respective process step contributes to the carbon footprint of the product, wherein each process step of the interconnected process steps is represented by an arrow displayed in the graphical user interface, wherein each arrow has a width that reflects an amount of greenhouse gases in a respective process step that contribute to the carbon footprint of the product that are generated as a result of each respective process step, wherein further information is displayed when hovering over each arrow to provide information about one or more of the raw material, intermediate, product, or exact value of the greenhouse gas emission of each process step, and wherein the width of each arrow reflecting the amount of greenhouse gases associated with a respective process step is updated based on the gathered process data in the graphical user interface.

* * * * *